UNITED STATES PATENT OFFICE 2,090,756

ALKYL AND ALKYLAMINE ESTERS OF P-AMINOTHIOBENZOIC ACID AND RELATED COMPOUNDS

Harold L. Hansen, Chicago, and Leonard S. Fosdick, Evanston, Ill.

No Drawing. Application June 17, 1935, Serial No. 26,922

5 Claims. (Cl. 260—99.10)

Our invention relates to anesthetics and more particularly to a series of compounds which we have found to be of exceptional value as local anesthetics.

Our new series of compounds is chemically related to the compound known as procaine (sometimes called novocaine), p - amino - benzoyl - diethyl-amino-ethanol hydrochloride, and has the characterizing difference therefrom in that our improved compounds are thio rather than carboxy derivatives.

We have prepared a series of such thio compounds, which correspond to the procaine series of compounds. We have found such new thio derivatives to have marked anesthetic properties both for topical anesthesia and, when soluble, for injection.

Our improved compounds conform to the following general formulas:

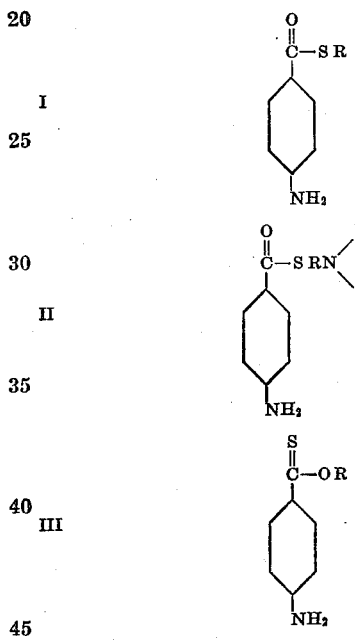

where R and R' in each case are alkyl radicals. In Formula II, R and R' may be the same or different.

Certain of our work in this field has been published by us as follows:

(1) Journal of the American Chemical Society, 55, 2872, July 6, 1933.

(2) Journal of Pharmacology and Experimental Therapeutics, Volume L, No. 3, March, 1934.

We found that the thio analog of procaine, which we have called thiocaine, upon pharmacologic investigation, has an anesthetic efficiency of from four to six times as that of procaine, when injected, and is approximately twice as powerful as cocaine when used as a topical anesthetic. The toxicity is about one-half that of cocaine. These results were checked clinically, with satisfactory results.

The thio derivative of novocaine may be prepared according to the following plan:

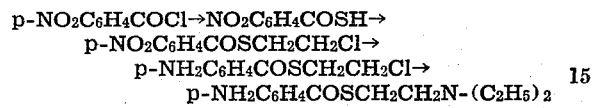

$$p-NH_2C_6H_4COSCH_2CH_2N-(C_2H_5)_2$$

Procedure

*p-Nitrothiolbenzoic acid.*—This substance was prepared according to a procedure based upon that of Kim, Ber. 32, 3533 (1899). In a five-liter flask equipped with a mechanical stirrer and dropping funnel was placed a solution of 162 g. of potassium hydroxide in about 3 liters of ethanol. The solution was then saturated with hydrogen sulfide. To the solution cooled in an ice-salt bath was added slowly with rapid stirring 265 g. of p-nitrobenzoyl chloride in dry benzene. The yellow precipitate was removed and the filtrate evaporated slowly under reduced pressure. The combined precipitates were dissolved in cold water and the free acid was liberated with hydrochloric acid. The yellow solid was purified by solution in dilute alkali, followed by liberation with hydrochloric acid. The yield was 262 g. or 94 per cent of the calculated amount, melting point 96–98° (corrected).

*n-Alkyl p - nitrothiolbenzoates.*—These compounds were prepared by the alkylation of potassium p-nitrothiolbenzoate with the corresponding alkyl bromides except in the case of the methyl ester, where methyl iodide was used. The following description is typical:

EXAMPLE I

*Ethyl p-nitrothiolbenzoate*

In a round-bottomed flask equipped with mechanical stirrer, dropping funnel, and condenser was placed 18.3 g. of 'p-nitrothiolbenzoic acid. To this was added 5.6 g. of potassium hydroxide in ethanol. The alkyl bromide was added dropwise with stirring and the flask was gently warmed to start the reaction. The mixture was heated on the water-bath for one hour to complete the reaction. The excess alcohol was removed by distillation and the residue poured into cold dilute alkali. The pale yellow precipitate was recrystallized from a mixture of ethanol and water.

*n-Alkyl p-aminothiolbenzoates.*—The nitro-esters were reduced with iron powder and hydrochloric acid. The hydrochloride of n-butyl p-aminothiolbenzoate is sparingly soluble in water and is best purified by precipitation from dry ether or benzene. The following experiment is typical:

EXAMPLE II

Methyl p-aminothiolbenzoate

To a mixture of 3 g. of methyl p-nitrothiolbenzoate, 75 cc. of 95 per cent ethanol and 20 cc. of concentrated hydrochloric acid cooled in ice water is added in small portions and with rapid stirring one gram of iron powder. Stirring is continued for four to six hours after all the iron has been added. The reaction mixture is then filtered and the filtrate poured into four times its volume of ice water. The amino compound is precipitated by careful addition of ammonium hydroxide. The crude product is dissolved in absolute ethanol and precipitated with cold water. Recrystallization from a mixture of ethanol and water give a very pale yellow flaky precipitate.

EXAMPLE III

β-Chloroethyl p-nitrothiolbenzoate

This substance is prepared from 183 g. of p-nitrothiolbenzoic acid and 183 g. of 1-chloro-2-bromoethane according to the method previously described. The yellow compound is recrystallized from 98 per cent ethanol.

EXAMPLE IV

β-Chloroethyl p-aminothiolbenzoate

This compound is prepared from the nitro compound according to the method previously described with the exception that the reaction is allowed to run for about 20 hours. The product is purified by precipitation as the hydrochloride from dry ether. The hydrochloride is then suspended in water and treated with ammonium hydroxide.

EXAMPLE V

β-Diethylaminoethyl p-aminothiolbenzoate

A mixture of 30 g. of β-chloroethyl p-aminothiolbenzoate and 30 g. of diethylamine was heated in a sealed tube at 100–110° for six hours. The contents of the tube were washed into an excess of cold dilute hydrochloric acid. The filtered acidic solution was neutralized with sodium hydroxide solution with strong cooling. The yellow precipitate was dissolved in dilute hydrochloric acid and warmed on the steam-bath with decolorizing carbon. The free base was precipitated by the addition of ammonium hydroxide in the cold. From dilute solutions it forms grayish-white needles. It was further purified by recrystallization from a mixture of ethanol and water. Occasionally a product of pronounced yellow color is obtained. This may be purified by treatment with decolorizing carbon, followed by recrystallization. The hydrochloride was obtained by treating the free base in dry ether with dry hydrogen chloride. Recrystallization from 98 per cent ethanol gave a fine yellow powder, freely soluble in water and fairly stable to boiling.

The following is a summary of certain compounds embodying our invention, which we have prepared, together with their melting points:

| Compound | M. P. °C. (corrected) |
|---|---|
| p-NO$_2$C$_6$H$_4$COSCH$_3$ | 96–97 |
| p-NO$_2$C$_6$H$_4$COSC$_2$H$_5$ | 67–68 |
| p-NO$_2$C$_6$H$_4$COSC$_3$H$_7$ | 30–31 |
| p-NO$_2$C$_6$H$_4$COSC$_4$H$_9$ | 13–15 |
| p-NH$_2$C$_6$H$_4$COSCH$_3$ | 113–114 |
| p-NH$_2$C$_6$H$_4$COSC$_2$H$_5$ | 79–79.5 |
| p-NH$_2$C$_6$H$_4$COSC$_3$H$_7$ | 60–61 |
| p-NH$_2$C$_6$H$_4$COSC$_4$H$_9$ | 37–38 |
| p-NO$_2$C$_6$H$_4$COSCH$_2$CH$_2$Cl | 91–92 |
| p-NH$_2$C$_6$H$_4$COSCH$_2$CH$_2$Cl | 99–101 |
| p-NH$_2$C$_6$H$_4$COSC$_2$H$_4$N(C$_2$H$_5$)$_2$ | 52–52.5 |
| p-NH$_2$C$_6$H$_4$COSC$_2$H$_4$N(C$_2$H$_5$)$_2$.HCl | 177.6–178 |

SALTS OF THIOCAINE

The borate is prepared by refluxing a dry acetone solution of thiocaine under a Soxhlet extractor containing boric acid. The product thus obtained is insoluble in acetone, benzene and ether, and decomposes upon heating. It is slowly soluble in water and with the latter medium it is difficult to prepare a solution suitable for injection. However, when the thiocaine borate is previously mixed with potassium dihydrogen phosphate a clear solution suitable for injection is readily obtained. The borate has been found to have excellent properties as a local anesthetic, as have also the other salts named herein.

THE ACID OXALATE OF THIOCAINE

This salt is prepared by treating thiocaine free base in absolute alcohol with the one-half molecular quantity of oxalic acid. The salt thus formed is precipitated from the alcoholic solution by the addition of ether. The oxalate is fairly soluble in water and insoluble in ether. Softens 122°; melts 123–124°.

THE CITRATE OF THIOCAINE

The citrate of thiocaine is prepared by treating thiocaine base in absolute alcohol with one third the molecular quantity of citric acid. This salt is soluble in water and insoluble in cold absolute alcohol. Melting point 123–124°.

COMPOUNDS RELATED TO THIOCAINE

*β-Dinormal propylaminoethyl p-aminothiolbenzoate* NH$_2$C$_6$H$_4$COSCH$_2$CH$_2$N(C$_3$H$_7$)$_2$ This compound is prepared by reacting β-chloroethyl p-aminothiolbenzoate with dinormal propyl amine. The compound obtained is soluble in alcohol and in acetone and insoluble in water. The hydrochloride salt is prepared by evaporation of a solution of the base dissolved in the calculated amount of dilute hydrochloric acid. This salt, twice recrystallized from absolute alcohol, has a melting point of 214–215°. The borate and the oxalate salts are also prepared according to the methods previously outlined, and have anesthetic properties. The borate has no definite melting point. Oxalate shrivels 100° and melts 131–134°.

*β-Dinormal butylaminoethyl-p-aminothiolbenzoate* NH$_2$C$_6$H$_4$COSCH$_2$CH$_2$N(C$_4$H$_9$)$_2$ This compound is prepared by heating a mixture of β-chloroethylthiolbenzoate and dinormalbutylamine on an oil bath until reaction is complete. The compound obtained is soluble in alcohol and in acetone and insoluble in water. The borate has no definite melting point. The oxalate is prepared according to the methods outlined above. Melting point 174-177°. They have anesthetic properties.

BROMOPROPYL P-NITROTHIOLBENZOATE (AN INTERMEDIATE)

This compound is prepared by treating the potassium salt of p-nitrothiolbenzoic acid in alcohol with an excess of trimethylene dibromide. The yellow solid obtained on pouring the reaction mixture onto ice is soluble in hot ethyl alcohol and insoluble in cold alcohol and in water. Melting point 67-69°.

BROMOPROPYL P-AMINOTHIOLBENZOATE (AN INTERMEDIATE)

The nitro compound listed above is reduced by means of iron powder and hydrochloric acid to give the amino compound. The latter substance is soluble in ether and in acetone. For purposes of identification the amino compound is transformed to the hydrochloride. Melting point 185-190° with decomposition.

DIETHYLAMINOPROPYL P-AMINOTHIOLBENZOATE

This compound is prepared from diethyl amine and bromopropyl p-aminothiolbenzoate according to the methods used for thiocaine. The product obtained is soluble in acetone and in ethyl alcohol but insoluble in water. The borate has been prepared, and has no definite melting point. The oxalate melting point is 115-117°. They have anesthetic properties.

DINORMALPROPYLAMINOPROPYL P-AMINOTHIOLBENZOATE

This compound is prepared by reacting dinormal propylamine with bromopropyl p-aminothiolbenzoate. The compound is soluble in acetone and in warm ethyl alcohol and insoluble in water. The oxalate is prepared in the usual manner. Shrivels 127°. Melting point 148-150°. It has anesthetic properties.

DINORMALBUTYLAMINOPROPYL P-AMINOTHIOLBENZOATE

This compound is prepared by reacting dinormal butyl amine with bromopropyl p-aminothiolbenzoate. The product is soluble in acetone and insoluble in water. Oxalate shrivels 195°; melting point 197-198°. It has anesthetic properties.

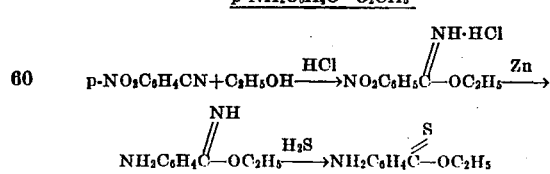

$$p\text{-}NO_2C_6H_4CN + C_2H_5OH \xrightarrow{HCl} NO_2C_6H_5\overset{NH\cdot HCl}{\underset{}{C}}\text{—}OC_2H_5 \xrightarrow{Zn}$$

$$NH_2C_6H_4\overset{NH}{\underset{}{C}}\text{—}OC_2H_5 \xrightarrow{H_2S} NH_2C_6H_4\overset{S}{\underset{}{C}}\text{—}OC_2H_5$$

Dry hydrogen chloride is passed into a solution of p-nitrophenyl cyanide (2 grams) in 20 cc. absolute alcohol until saturation is complete. At the beginning of the reaction heat is evolved so that the saturation is complete with the solution cooled in ice. The reaction mixture is kept in the ice box for several days, during which time it is removed at intervals and treated with dry hydrogen chloride. At the end of that time needles will have started to form at the bottom of the flask.

The nitro ester is not isolated but is reduced to the amino compound with zinc (3.2 grams). When the reaction has been completed the reaction mixture is neutralized with sodium carbonate and is then extracted with ether and the ether dried over sodium sulfate. Upon removal of the ether a solid is obtained, melting point 70-74° (uncorrected).

The solid is taken up in dry ether and saturated with dry hydrogen sulfide in the cold. This reaction is allowed to run for two days, treatment with hydrogen sulfide being intermittent. The ether solution is washed several times with water and then dried over sodium sulfate. Dry hydrogen chloride is then passed into the ether solution. The yellow hydrochloride is removed by filtration, suspended in ice water and treated with ammonium hydroxide. The free base is removed by filtration and dissolved in alcohol. The alcoholic solution is filtered and the ethyl p-aminothionbenzoate is again precipitated by pouring the alcoholic solution with stirring into ice water. The yellow precipitate is dried over calcium chloride. Melting point 63-64 (uncorrected). The yield is about one gram.

The compound is insoluble in water and soluble in ethyl alcohol, ether and acetone. It possesses a distinct yellow color and a rather sharp taste. It is not so strongly anesthetic as the corresponding thiol compound. When the thion ester is dissolved in alcoholic lead acetate and the solution warmed on the steam bath a precipitate of lead sulfide is obtained.

We claim as our invention:

1. A compound which is a member of the group consisting of

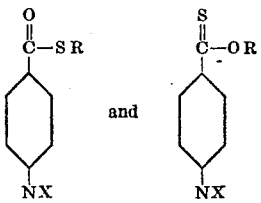

wherein X is selected from the group consisting of $O_2$ and $H_2$ and R is a radical from the group consisting of alkyl, alkylamine, and alkylamine salts.

2. A compound having the formula

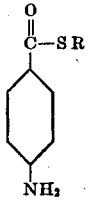

wherein R is an alkyl radical.

3. A compound which is a member of the group consisting of β-diethylaminoethyl p-aminothiolbenzoate and salts thereof.

4. A compound which is a member of the group consisting of β-dinormalpropylaminoethyl p-aminothiolbenzoate and salts thereof.

5. Ethyl p-aminothiolbenzoate.

HAROLD L. HANSEN.
LEONARD S. FOSDICK.